Figure 1:
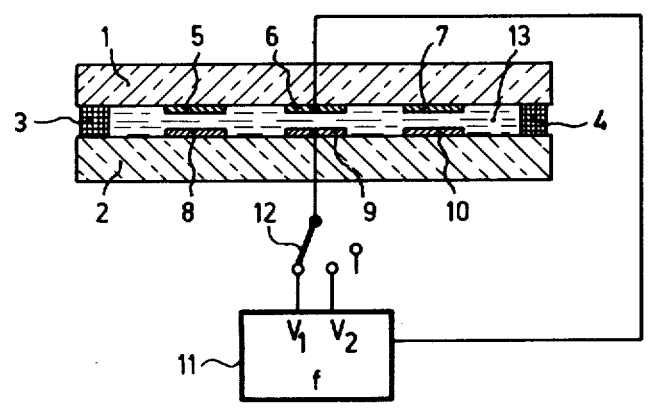

United States Patent [19]

Gerritsma et al.

[11] 4,011,008
[45] Mar. 8, 1977

[54] DISPLAY DEVICE COMPRISING A LAYER OF LIQUID CRYSTAL

[75] Inventors: Cornelis Jan Gerritsma; Wilhelmus Hendrikus de Jeu, both of Eindhoven, Netherlands

[73] Assignee: U.S. Philips Corporation, New York, N.Y.

[22] Filed: Apr. 12, 1974

[21] Appl. No.: 460,355

[30] Foreign Application Priority Data
Apr. 18, 1973 Netherlands ............... 7305413

[52] U.S. Cl. .................. 350/160 LC; 252/299
[51] Int. Cl.² ............................ G02F 1/13
[58] Field of Search .................... 350/160 LC

[56] References Cited
UNITED STATES PATENTS

| | | | |
|---|---|---|---|
| 3,703,331 | 11/1972 | Goldmacher et al. | 350/160 LC |
| 3,767,289 | 10/1973 | Aviram et al. | 350/160 LC UX |

*Primary Examiner*—John K. Corbin
*Assistant Examiner*—Matthew W. Koren
*Attorney, Agent, or Firm*—Frank R. Trifari; Norman N. Spain

[57] ABSTRACT

A display device comprising a mixture of a nematic liquid crystal having a large negative dielectric anisotropy and an optically active material. The information is recorded and erased with voltages of the same frequency. Erasing is carried out with a larger voltage than recording.

4 Claims, 2 Drawing Figures

DISPLAY DEVICE COMPRISING A LAYER OF LIQUID CRYSTAL

The invention relates to a display device comprising a mixture of a nematic liquid crystal having negative dielectric anisotropy $\Delta \epsilon ( \Delta \epsilon = \epsilon_\| - \epsilon_\perp$ ) and an optically active material between two supporting plates provided with electrodes and having means for supplying an alternating voltage to at least two of the said electrodes for recording information.

Such a picture display device is known from the article "A new electric field controlled reflective optical storage effect in mixed liquid crystal systems" in Proceedings of the IEEE, volume 57, No. 1, Jan. 1, 1969, pp.34–38. In this article it is described that a layer of liquid crystal which is transparent in the rest condition locally scatters light under the influence of an electric field. For this purpose a direct voltage or an alternating voltage having a frequency of, for example, 100 Hz is set up between the electrodes. The recorded information is maintained for a considerable period of time after switching off the voltage but can also be erased rapidly by means of a voltage having a larger frequency of, for example, 1000 Hz. As an optically active material a cholesteric liquid crystal is used which is the cause of the memory effect of the device. Actually, the optically active material prevents the natural return of the nematic liquid crystal to the transparent rest condition as a result of which said crystal remains scattering light like a kind of emulsion. When once it has returned to the aligned condition, the cholesteric molecules readily join in the lattice of the nematic molecules so that the transparent state is formed.

It is the object of the present invention to provide such a display device in which the information is recorded and erased by means of a much simpler circuit.

According to the invention, a display device of the type mentioned in the first paragraph is characterized in that for erasing the information an alternating voltage having the same frequency as during recording and with a larger amplitude is applied to the said electrodes.

Good results are achieved with a block voltage the frequency of which is smaller than 3000 Hz. The said amplitude upon erasing is preferably 1.2 to 3 times as large as during recording. Good results are furthermore achieved with nematic liquid crystals from the group p, p' substituted cyano-trans-stilbenes. The said optically active material preferably is a cholesteric liquid crystal.

Figure 2:
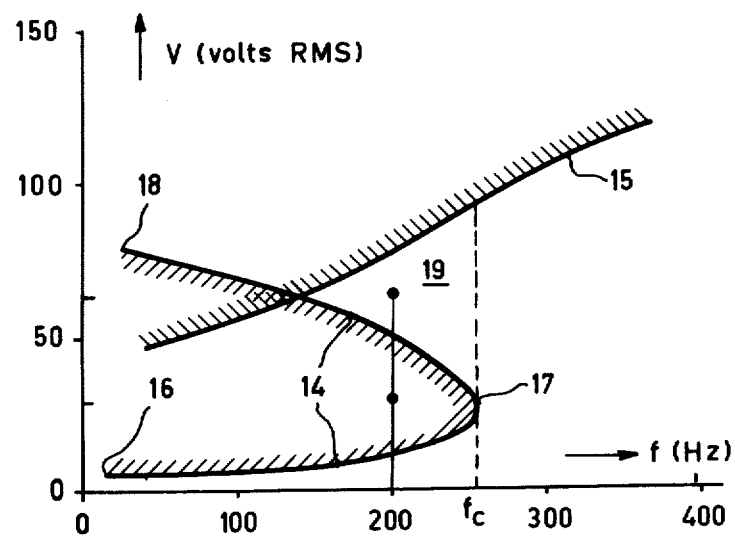

The invention will be described in greater detail with reference to the accompanying drawing, of which FIG. 1 shows a picture display device according to the invention, and FIG. 2 shows graphically the behaviour of a nematic liquid crystal having a large negative dielectric anisotropy.

The picture display device shown in FIG. 1 comprises a first supporting plate 1 and a second supporting plate 2. The plates 1 and 2 which are manufactured from glass are kept spaced apart by spacers 3 and 4. A layer 13, approximately 0.02 mm thick, of a nematic cholesteric liquid crystal mixture consisting of p-ethoxy-p'-hexyloxy-α-cyano-trans-stilbene and approximately 2% cholesteryl nonanoate is present between the plates 1 and 2. Thin transparent electrodes 5–10 of tin oxide are present on the plates 1 and 2. The electrodes 6 and 9 are connected to the electric circuit 11. By means of the switch 12, the voltage between the electrodes 6 and 9 can be adjusted to 0 volt, 30 volt/200 Hz and 60 volt/200 Hz. At 30 v/200 Hz the layer of liquid crystal which is transparent in the rest condition locally scatters the transmitted light. In this manner, for example, digits can be displayed by means of seven electrodes which are arranged in the form of an eight. A picture which is made up of dots can also be displayed.

When the voltage is then switched off, the recorded image is maintained for an ample period of time, which is a great advantage in the case of non-rapidly changing information (for example, in clockworks). As already stated it was known that the information can be erased by means of a higher frequency, for example, 1000 Hz. However, this makes the circuit complicated because in this case it has to supply two frequencies. According to the invention, the picture can be erased with a voltage having a larger but not too large a voltage of the same frequency. For that purpose, an erasing voltage of 60 V/200 Hz is set up at the electrodes 6 and 9. This need last only a short time. After approximately 100 to 500 msec. the transparent condition occurs again. During the switching off of the erasing voltage, the range of the voltages at which information can be recorded is traversed for a short period of time. Since this can be done rapidly, this proves to be not troublesome.

The above-described phenomena are explained with reference to FIG. 2. The effective value of the alternating voltage between two electrodes on either side of a 0.02 mm thick layer of p-ethoxy-p'-hexyloxy-α-cyano-trans-stilbene which nematic liquid crystal has a dielectric anisotropy of approximately −5.5 at temperatures to approximately 75° C is plotted on the vertical axis. The frequency of said voltage is plotted on the horizontal axis. The lines 14 and 15 determine the regions, as a function of the value and the frequency of the voltage, where the layer of liquid crystal scatters light. These regions are present on the shaped side of the lines 14 and 15. The branch between the points 16 and 17 of the line 14, as well as the line 15 for frequencies higher than $f_c$, are known from the prior art which relates to nematic liquid crystals having a dielectric anisotropy of approximately −0.5. This is proved, for example, by the article "Transition between conduction and dielectric regimes of the electrohydrodynamic instabilities in a nematic liquid crystal" in Physics Letters, vol. 39A, No. 3, May 8, 1972, pp. 181-182, in particular FIG. 1. At a voltage immediately above the branch 16–17, a weak light scattering occurs as a result of the formation of so-called Williams domains which have an extent of the order of magnitude of the thickness of the layer. When the voltage is increased, a strong light scattering then occurs due to turbulent flow in the liquid crystal.

At a voltage immediately above the line 15 a weak light scattering occurs due to the formation of so-called chevrons, after which at higher voltage turbulence occurs again.

It has now been found that in the case of nematic liquid crystals having a strongly negative dielectric anisotropy the line 14 bends back beyond the point 17 as is shown in FIG. 2. The result is that a region 19 where no light scattering occurs is formed above the branch 17, 18 of the line 14 and below the line 15. It has furthermore been found that recorded information can be rapidly erased with voltages in the region 19 in the case in which an optically active material has been added to obtain a memory. This means that, due to the negative dielectric anisotropy, the layer of liquid crystal is forced back to the transparent condition under the influence of the electric field. This is quite analogous to the already known erasing at higher frequencies.

The existence of the branch 17-18 of the line 14 can qualitatively be explained as follows. In the transparent condition the long axis of the elongate molecules of the nematic liquid crystal is parallel to the supporting plates 1 and 2. The electric field E between the electrodes 6 and 9 has a stabilising effect on this condition, for $\Delta\epsilon<0$. The value of the stabilising couple is proportional to $\Delta\epsilon.E^2$. The turbulence is formed in that the conduction of the liquid crystal is also anisotropic, namely ions move more easily parallel to the long axis of the molecules than perpendicularly thereto. So $\sigma_\parallel > \sigma_\perp$ namely $\sigma_\parallel \approx 1.5\sigma_\perp$. This has for its result that a small initial disturbance of the position of the molecules parallel to the supporting plates results in an inhomogeneous current distribution as a result of which a space charge distribution is obtained. As a result of this, transverse fields on a microscopic scale are formed which are proportional to E and increase the initial disturbance so that ultimately turbulence is obtained. Since, however, the stabilising couple is proportional to $E^2$, this predominates again with large $|\Delta\epsilon|$ when E increases. In the described play of forces, an elastic couple which tries to maintain the mutually parallel coherence of the molecules and thus has a stabilising effect and a viscous couple which is proportional to E and which is caused by the fact that the molecules tend to orient parallel to their direction of flow and which hence has a unstabilising effect are furthermore operative.

Nematic liquid crystals having a strongly negative dielectric anisotropy had been unknown so far. Of course the invention is not restricted to the use of the p-ethoxy-p'-hyxyloxy-α-cyano-trans-stilbene mentioned as an example. In principle, any nematic liquid crystal having a $\Delta\epsilon<-1$, so with a large negative dielectric anisotropy, is useful, in particular those which are described in the not yet published Dutch Pat. application No. 7,211,383 (PHN 6475) of the general formula

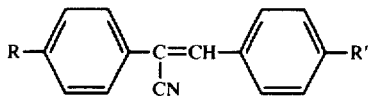

where R and R' represent a branched or unbranched alkyl, alkoxy or acyloxy group containing up to 8 carbon atoms, but do not both signify a methyl or methoxy group. Examples of these compounds are: 3-(p-methoxyphenyl)-; 3-(p-ethoxyphenyl)-; 3-(p-propoxyphenyl)-; 3-(p-butoxyphenyl)-; 3-(p-pentyloxyphenyl)-; 3-(p-hexyloxyphenyl)-; 3(p-heptyloxyphenyl)- and 3-(p-octyloxyphenyl)-2-(p-butoxyphenyl) acrylonitrile; 3-(p-methoxyphenyl)-; 3-(p-ethoxyphenyl)-; 3-(propoxyphenyl)-; 3-(p-butoxyphenyl)-; 3-(p-pentyloxyphenyl)-; 3-(p-hexyloxyphenyl)-; 3-(p-heptyloxyphenyl)- and 3-(p-octyloxyphenyl)-2-(p-hexyloxyphenyl) acrylonitrile; 3-(p-methoxyphenyl)-; 3-(p-ethoxyphenyl)-3-(p-propoxy-phenyl)-; 3-(p-butoxyphenyl)-; 3-(p-pentyloxyphenyl)-; 3-(p-hexyloxyphenyl)-; 3-(p-heptyloxyphenyl)- and 3-(p-octyloxyphenyl) -2-(p-ethoxyphenyl) acrylonitrile. 3-(p-formyloxyphenyl)-; 3-(p-acetyloxyphenyl)-; 3-(propionyloxyphenyl)-; 3-(p-butyruloxyphenyl)-; 3-(p-valeryloxy-phenyl)-; 3-(p-caproyloxyphenyl)-; 3-(p-heptyloxyloxyphenyl)-and 3-(p-capryloyloxyphenyl)-2-(p-butoxyphenyl) acrylonitrile. 3-(p-butoxyphenyl)-; 3-p-(hexyloxyphenyl)- and 3-(p-octyloxyphenyl)-2-(p-methylphenyl) acrylonitrile; 3-(p-ethoxyphenyl)-; 3-(p-butoxyphenyl)-; 3-(p-pentyloxy-phenyl)-; 3-(p-hexyloxyphenyl)- and 3-(p-octyloxyphenyl)-2-(p-propylphenyl) acrylonitrile; 3-(p-methoxyphenyl)-; 3-(p-ethoxyphenyl)-; 3-(p-butoxyphenyl)-; 3-(p-hexyloxyphenyl)- and 3-(p-octyloxyphenyl)-2-(p-pentyl-phenyl) acrylonitrile; 3-(p-acetyloxyphenyl)-; 3-(p-propionyloxyphenyl)-; 3-(p-butyryloxyphenyl)- and 3-(p-caproyloxyphenyl)-2-(p-methylphenyl)acrylonitrile, as well as the corresponding 2(p-ethylphenyl), 2-(p-propylphenyl), 2-(p-butylphenyl), 2-(p-pentylphenyl), 2-(p-hexylphenyl), 2-(p-heptylphenyl) and 2-(p-octylphenyl) acrylonitrile derivatives for example p-oxybutyl-p'-oxypentyl-α-cyano-trans-stilbene and p-oxybutyl-p'-oxyethyl-α-cyano-trans-stilbene. As an optically active material may be used any cholesteric liquid crystal in concentrations up to approximately 10%, for example, the cholesteryl nonanoate mentioned in the example. Non-liquid crystalline optically active materials may also be used in concentrations in which the liquid crystalline state of the mixture is maintained. Examples of such materials are L-methol (levo rotary; Chemical Physics Letters, vol. 6, 1970, p.5) and D-tartaric acid (dextrorotary; Chemical Physics Letters, vol. 3, 1969, p. 540).

What is claimed is:

1. A display device comprising a mixture of a nematic liquid crystal having a negative dielectric anisotropy $\Delta\epsilon<-1(\Delta\epsilon=\epsilon_\parallel -\epsilon_\perp)$ and being a stilbene of the formula:

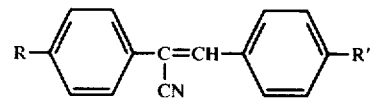

where R and R' are each alkyl, alkoxy or acyloxy of up to 8 carbon atoms with the proviso that R and R' do not both represent methyl or methoxy and an optically active material between two supporting plates provided with electrodes, said nematic liquid crystal exhibiting light scattering properties below a critical frequency when a voltage is supplied to at least two of said electrodes in a first range of voltages between a first frequency dependent minimum and a frequency dependent maximum of said voltage as well as in a second range of voltages above a second frequency dependent minimum of said voltage, said nematic crystal being transparent when subjected to a voltage between said frequency dependent maximum and said second frequency dependent minimum in a range of frequencies said second frequency dependent minimum being higher than said frequency dependent maximum, means for supplying recording and erasing voltages having the same frequency in said range of frequencies to at least two of said electrodes, said recording voltage being between said first minimum and said maximum of said voltage and said erasing voltage being between said maximum and said second minimum of said voltage.

2. A display device as claimed in claim 1, wherein said optically active material is a cholesteric liquid crystal.

3. The display device of claim 1 wherein said erasing voltage has a frequency smaller than 300 HZ.

4. The display device of claim 1 wherein the amplitude of the erasing voltage is 1.2 to 3 times as large as the recording voltage.

* * * * *